United States Patent [19]

Lugez

[11] Patent Number: 4,898,638
[45] Date of Patent: Feb. 6, 1990

[54] METHOD OF MANUFACTURING FLEXIBLE GASKETS WHICH WITHSTAND CHEMICAL AGENTS

[75] Inventor: Pierre Lugez, Le Neubourg, France

[73] Assignee: Valois S.A., Le Neubourg, France

[21] Appl. No.: 276,740

[22] Filed: Nov. 28, 1988

[30] Foreign Application Priority Data

Nov. 26, 1987 [FR] France ............... 87 16427

[51] Int. Cl.$^4$ .............. B29C 47/06; B32B 25/08; B32B 31/04; B32B 31/28
[52] U.S. Cl. .................. 156/272.6; 156/242; 156/244.17; 156/244.27; 156/297; 156/324; 204/169; 264/22; 264/171; 264/210.2; 264/236; 277/228; 277/DIG. 6
[58] Field of Search .......... 264/22, 134, 171, 210.2, 264/211.12, 236; 156/242, 244.17, 244.27, 272.6, 273.3, 297, 313, 324; 204/165, 168, 169; 277/228, DIG. 6

[56] References Cited

U.S. PATENT DOCUMENTS

| 3,030,290 | 4/1962 | Ryan, Jr. ............ 204/169 |
| 3,323,965 | 6/1967 | Hanle et al. ......... 264/22 X |
| 4,133,927 | 1/1979 | Tomoda et al. ....... 156/242 X |
| 4,389,271 | 6/1983 | Shandy et al. ....... 156/242 |
| 4,397,706 | 8/1983 | Allen et al. ......... 156/242 |

FOREIGN PATENT DOCUMENTS

| 205312 | 12/1986 | European Pat. Off. ........ 264/320 |
| 59-214620 | 12/1984 | Japan ............... 156/272.6 |
| 61-213229 | 9/1986 | Japan ............... 264/22 |
| 1083778 | 9/1967 | United Kingdom ....... 264/22 |

Primary Examiner—Jeffery Thurlow
Assistant Examiner—Leo B. Tentoni
Attorney, Agent, or Firm—Sughrue, Mion, Zinn, Macpeak & Seas

[57] ABSTRACT

In order to manufacture sealing gaskets for receptacles containing aggressive chemical substances, one known technique consists in coating a film of PTFE or other plastic material onto rubber. However, in the past, it has been possible to ensure that the film adheres adequately to the rubber only by making use of an intermediate glue. The present method causes a film of PTFE to adhere directly on a sheet of rubber by treating one of the faces of the PTFE film by the corona effect and then rolling the treated film against the rubber while still raw and vulcanizing the resulting laminated structure.

5 Claims, 1 Drawing Sheet

METHOD OF MANUFACTURING FLEXIBLE GASKETS WHICH WITHSTAND CHEMICAL AGENTS

The present invention relates to a method of manufacturing flexible gaskets for closing receptacles, and also to a gasket obtained by using the method. The invention is particularly, but not exclusively, intended for use in providing gaskets for valves and for sprayers.

BACKGROUND OF THE INVENTION

In order to obtain good selling between a receptacle and its lid, it is necessary for the gasket to be somewhat flexible, and naturally it is also necessary for it to withstand chemically the substance that is to be contained in the receptacle. In order to obtain flexibility, it is common practice to use rubber. There are numerous different natural and synthetic rubber formulas having different hardnesses, and different qualities of chemical resistance. Unfortunately, there are numerous substances, to be found in particular perfumery and in medicines, which attack or dissolve all types of rubber: the gasket ceases to provide sealing and the substance contained in the receptacle may be unacceptably polluted or degraded.

There are numerous other flexible materials which stand up well to coming into contact with the substances used in the perfumery, pharmacy, and other chemical industries, for example there are the synthetic plastic materials known under the trademarks NYLON and TEFLON (polytetrafluoroethylene or PTFE). However, these substances are not flexible enough to obtain the desired degree of sealing. Attempts have therefore been made to combine these substances, e.g. by coating a rubber gasket with a thin layer of TEFLON.

On these lines, German patent application DE 2 647 524 filed in 1976 by the Japanese company Daikin Kogyo Co. Ltd. suggests rolling a film of TEFLON onto a sheet of rubber and then vulcanizing the assembly. As emphasized in this prior publication, the method nevertheless suffers from a practical difficulty: normal TEFLON films do not adhere to rubber. In order to obtain the desired adherence, experience shows that it is necessary to use TEFLON which has been made porous by some appropriate method: sintering or extruding PTFE powder in an appropriate solvent; weaving or agglomerating fibers of PTFE; or indeed obtaining separation in the form of a PTFE foam. Unfortunately, gaskets made in this way remain relatively vulnerable to chemical attack since the aggressive substances can filter through the pores in the TEFLON film and reach the rubber. That is why the above-mentioned prior application recommends interposing a layer of glue between the rubber and the porous TEFLON film. However, the application of an intermediate glue constitutes an additional operation which naturally gives rise to additional cost.

The object of the present invention is to avoid such extra cost and thus to seek a method for causing a film of TEFLON to adhere directly on rubber, while ensuring that the TEFLON film is of a structure suitable for providing protection from chemical attack by aggressive substances on a long term basis.

SUMMARY OF THE INVENTION

The present invention provides a method of manufacturing flexible gaskets which withstand chemical attack from fluid substances, said method consisting in applying at least one film of PTFE directly onto a sheet of raw rubber and in subjecting said sheet of rubber together with said film of PTFE to heating and to pressure suitable for causing said rubber to vulcanize, wherein said film of PTFE is previously treated by the corona effect on that one of its two faces which comes into contact with said sheet of rubber.

Advantageously, said film of PTFE is applied to said sheet of rubber by rolling in a system of drums, said heating being transmitted by one of the drums in said system of drums, and said pressure being exerted by a metal strip passing around said drums in such a manner as to be adjustable in tension.

In another implementation of the method, two films of PTFE are applied to said sheet of raw rubber and they are both subjected to said heating and to said pressure for the purpose of vulcanizing said rubber, with one of the two faces of each of said PTFE films being treated by the corona effect and coming into contact with a corresponding one of the opposite faces of said sheet of rubber.

The rubber may be a synthetic rubber including at least one cross-linking agent taken from the set of cross-linking agents constituted by: sulfur; organic peroxides; metallic oxides; resins; and other vulcanizing substances. The synthetic rubber may optionally be mixed with a filler including at least one of the substances in the group of substances constituted by: kaolin; silica; and carbon black.

Sealing gaskets stamped from a multilayer sheet obtained by the method of the invention have a structure which guarantees their effectiveness. The results of treating a PTFE film by the corona effect, i.e. bombarding its surface with a corona discharge, establishes numerous, small, cone-shaped cavities in said surface (cf. the article "New surface improvement technique for PTFE film" in volume 20, No. 187 of Japan Plastics Age, September–October 1982). Experience shows that this suffices for obtaining adherence with rubber. There is therefore no need for the PTFE film to be porous throughout its bulk. The thickness of the film left untouched by the corona effect is sufficient to prevent aggressive chemical substances from penetrating all the way to the rubber.

BRIEF DESCRIPTION OF THE DRAWING

An implementation of the invention is described by way of exammple with reference to the accompanying drawing, in which the sole FIGURE is a diagrammatic view of continuous fabrication of a composite sheet from which gaskets in accordance with the invention can be cut out.

MORE DETAILED DESCRIPTION

Figure 1:
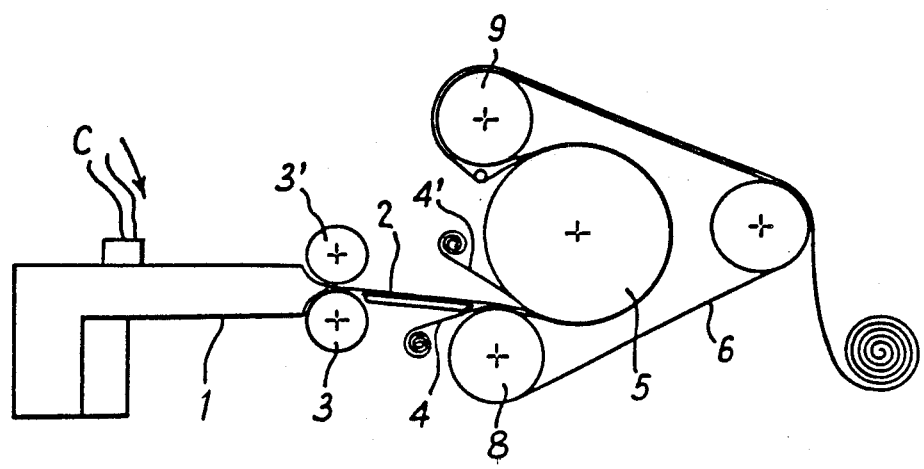

According to the invention, a PTFE plastic film is treated on one of its faces by the corona effect and the treated face is supplied to a sheet of non-vulcanized rubber. The assembly is then subjected continuously or intermittently in conventional manner to vulcanization by application of heat and pressure, e.g. in a press.

The sole FIGURE of the accompanying drawing is a diagram of an installation for continuously vulcanizing a sheet of rubber. The installation is modified by the addition of means for placing a film of PTFE on each face of the sheet of rubber, with the face of each PTFE film that is applied against the rubber being a face which has previously been treated by the corona effect in a conventional manner.

Rubber C is fed to an extruder 1 and a sheet of non-vulcanized rubber 2 leaves between two rolls 3 and 3'. The sheet 2 is sandwiched between two plastic films 4 and 4' and is then inserted between a vulcanizing drum 5 and a flexible metal strip 6. The drum 5 is appropriately heated, and the tension of the strip 6 ensures that vulcanizing pressure is applied. It has been observed under these conditions that the corona treated PTFE film adheres the rubber during vulcanization. However, regardless of whether or not it has been treated by the corona effect, gluing the same plastic film onto vulcanized rubber gives rise to mediocre adhesion only, whereas using the method of the ivention, the sheet of PTFE cannot be torn off the rubber.

The result is particularly good using a synthetic rubber which is vulcanized in the form of a mixture containing crosslinking agents such as sulfur and/or an organic peroxide, and/or a metallic oxide, and/or a resin and/or any other vulcanizing substance. Advantageously, the rubber mixture includes filler such as kaolin, silica, and/or carbon black. The adherence of the plastic film on the rubber is excellent. Gaskets obtained from the sheet are flexible, thereby providing good sealing, and they withstand chemical agents well.

Naturally, the present invention is not limited to the above-described example. The person skilled in the art will be capable of varying or modifying it in numerous ways.

I claim:

1. A method of manufacturing a flexible gasket which withstands chemical attack from fluid substances, said method consisting in applying at least one film of PTFE (polytetrafluoroethylene) directly onto a sheet of raw rubber and in subjecting said sheet of rubber together with said film of PTFE to heating and to pressure suitable for causing said rubber to vulcanize, wherein said film of PTFE is previously treated by a corona effect which comprises bombarding said film with a corona discharge on that one of its two faces which comes into contact with said sheet of rubber.

2. A method according to claim 1, wherein said film of PTFE is applied to said sheet of rubber by rolling in a system of drums, said heating being transmitted by one of the drums in said system of drums, and said pressure being exerted by a metal strip passing around said drums in such a manner as to be adjustable in tension.

3. A method according to claim 1, wherein two films of PTFE are applied to said sheet of raw rubber and said films are both subjected to said heating and to said pressure to vulcanize said rubber, with one of the two faces of each of said PTFE films being treated by the corona effect and coming into contact with a corresponding one of a pair of opposite faces of said sheet of rubber.

4. A method according to claim 1, wherein said rubber is a synthetic rubber including at least one crosslinking agent selected from the group of crosslinking agents consisting of sulfur; organic peroxides; metallic oxides; resins; and other vulcanizing substances.

5. A method according to claim 1, wherein said rubber is a synthetic rubber mixed with a filler selected from the group consisting of kaolin; silica; and carbon black.

* * * * *